United States Patent
Dreps et al.

(10) Patent No.: US 9,774,389 B2
(45) Date of Patent: *Sep. 26, 2017

(54) DYNAMIC LINK REPAIR FROM LANE FAILURE WITH MINIMAL LINK DOWN-TIME WHILE SPARING FAULT CHANNELS

(71) Applicant: International Business Machines Corporation, Armonk, NY (US)

(72) Inventors: Daniel M. Dreps, Georgetown, TX (US); Nanju Na, Essex Junction, VT (US); Kaveh Naderi, Austin, TX (US); James E. Smith, Gerogetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,074

(22) Filed: Sep. 1, 2015

(65) Prior Publication Data

US 2017/0063449 A1 Mar. 2, 2017

(51) Int. Cl.
*G02F 1/00* (2006.01)
*H04B 10/038* (2013.01)
(Continued)

(52) U.S. Cl.
CPC ........... *H04B 10/038* (2013.01); *H04B 10/03* (2013.01); *H04L 41/0668* (2013.01);
(Continued)

(58) Field of Classification Search
CPC .... H04B 10/032; H04B 10/03; H04B 10/035; H04B 10/038; H04B 10/2575; H04Q 11/0003; H04Q 11/0005; H04Q 11/0067
(Continued)

(56) References Cited

U.S. PATENT DOCUMENTS

| | | | | |
|---|---|---|---|---|
| 7,801,442 B2* | 9/2010 | Wang | ........... | H04B 10/032 398/2 |
| 8,041,210 B2* | 10/2011 | Aronson | ........... | H04B 10/032 385/88 |

(Continued)

OTHER PUBLICATIONS

IBM "List of IBM Patents or Patent Applications Treated as Related", 2015.

(Continued)

*Primary Examiner* — Hanh Phan
(74) *Attorney, Agent, or Firm* — Patterson + Sheridan, LLP

(57) ABSTRACT

Computer program product and apparatus for repairing a communication link failure. In certain embodiments, the apparatus generally includes a controller configured to initialize the communication link for communication with another apparatus using an initial number of channels of a plurality of channels. The apparatus may also include a plurality of multiplexers configured to selectively couple a plurality of communication lanes with the plurality of channels of the communication link. In certain embodiments, during an initial state, a first lane of the plurality of lanes may be coupled with a first channel of the plurality of channels, and the plurality of channels may include a spare channel. The controller may determine whether at least one channel of the plurality of channels is experiencing a failure and control at least one of the multiplexers such that the failed channel is replaced by another channel of the plurality of channels by using the spare channel.

9 Claims, 5 Drawing Sheets

(51) Int. Cl.
*H04L 12/24* (2006.01)
*H04Q 11/00* (2006.01)
*H04B 10/03* (2013.01)

(52) U.S. Cl.
CPC ......... *H04Q 11/00* (2013.01); *H04Q 11/0071* (2013.01); *H04Q 2011/0081* (2013.01)

(58) Field of Classification Search
USPC .... 398/3, 5, 2, 4, 33, 38, 10, 13, 17, 19, 22, 398/23, 24, 135, 136, 139, 45, 48, 79, 398/138, 25, 7, 8; 370/216, 217, 218, 370/219, 220, 222, 225, 228
See application file for complete search history.

(56) References Cited

U.S. PATENT DOCUMENTS

| | | | |
|---|---|---|---|
| 9,351,055 B2 * | 5/2016 | Levy | ................ H04Q 11/0005 |
| 2009/0187683 A1 | 7/2009 | Adar et al. | |
| 2010/0178050 A1 | 7/2010 | Nakashima | |
| 2011/0311217 A1 | 12/2011 | Horiuchi et al. | |
| 2013/0236168 A1 * | 9/2013 | Matsui | ................ H04B 10/032 398/2 |
| 2014/0003451 A1 | 1/2014 | Wagh et al. | |
| 2014/0314401 A1 | 10/2014 | Fujimori | |

OTHER PUBLICATIONS

U.S. Appl. No. 14/869,434, entitled Dynamic Link Repair from Lane Failure with Minimal Link Down-Time While Sparing Fault Channels, filed Sep. 29, 2015.

IBM Knowledge Center, "PCIe Gen3 I/O expansion drawer," downloaded from <http://www-01.ibm.com/support/knowledgecenter/P8ESS/p8ham/p8ham_emx0_kickoff.htm> on Aug. 18, 2015, 1 page.

* cited by examiner

DYNAMIC LINK REPAIR FROM LANE FAILURE WITH MINIMAL LINK DOWN-TIME WHILE SPARING FAULT CHANNELS

STATEMENT REGARDING PRIOR DISCLOSURES BY THE INVENTOR OR JOINT INVENTOR

The following disclosure is submitted under 35. U.S.C. 102(b)(1)(A): "PCIe Gen3 I/O expansion drawer," *International Business Machines*, Jun. 4, 2015, http://www-01.ibm.com/support/knowledgecenter/P8ESS/p8ham/p8ham_emx0_kickoff.htm.

BACKGROUND

Modern computing systems include peripheral devices that are coupled to a computer processor via an expansion bus. Such an expansion bus may be embodied as a PCIe bus that may be coupled to many different types of peripheral devices. The number of lanes in a PCIe bus that may be utilized by a peripheral device may be determined based on the physical structure of the peripheral device.

SUMMARY

Certain embodiments of the present disclosure provide an apparatus for repairing communication lane failures. The apparatus generally includes a controller configured to initialize a communication link for communication with another apparatus using an initial number of channels of a plurality of channels; a plurality of multiplexers configured to selectively couple a plurality of communication lanes with the plurality of channels of the communication link, wherein, during an initial state, a first lane of the plurality of lanes is coupled with a first channel of the plurality of channels, wherein the plurality of channels comprises a spare channel, and wherein the controller is further configured to: determine whether at least one channel of the plurality of channels is experiencing a failure; and control at least one of the multiplexers such that the failed channel is replaced by another channel of the plurality of channels by using the spare channel.

Certain embodiments of the present disclosure provide a computer program product for repairing communication lane failures. The computer program product generally includes a computer readable storage medium having program instructions embodied therewith, the program instructions executable by a processor to cause the processor to: communicate with another apparatus using an initial number of channels of a plurality of channels of a communication link; selectively couple a plurality of communication lanes with the plurality of channels of the communication link, wherein, during an initial state, a first lane of the plurality of lanes is coupled with a first channel of the plurality of channels, and wherein the plurality of channels comprises a spare channel; determine whether at least one channel of the plurality of channels is experiencing a failure; and control at least one of the multiplexers such that the failed channel is replaced by another channel of the plurality of channels by using the spare channel.

DETAILED DESCRIPTION

Certain embodiments of the present disclosure are generally directed to replacing a failing channel of a communication link with a spare channel with reduced link down time. In certain embodiments, the communication interface may be a Peripheral Component Interconnect Express (PCIe) interface. A PCIe bus can include a number of lanes, each of which provide bandwidth to a device that is connected to the PCIe bus. A "lane" may refer to a set of differential signal pairs, one pair for transmission and one pair for reception. A "by-N" link in PCIe may be composed of N lanes, e.g., a "×8" link or slot supports 8 lanes of traffic to/from an input/output (I/O) adapter. Different devices may use different number of lanes for communication. For example, low-speed peripherals may use fewer lanes while high-speed peripherals may use more lanes. Thus, a PCIe bus represents a flexible interconnect between two devices—such as a processor and a peripheral device—as the PCIe bus can couple devices that may need varying bandwidths for operation.

Figure 1:
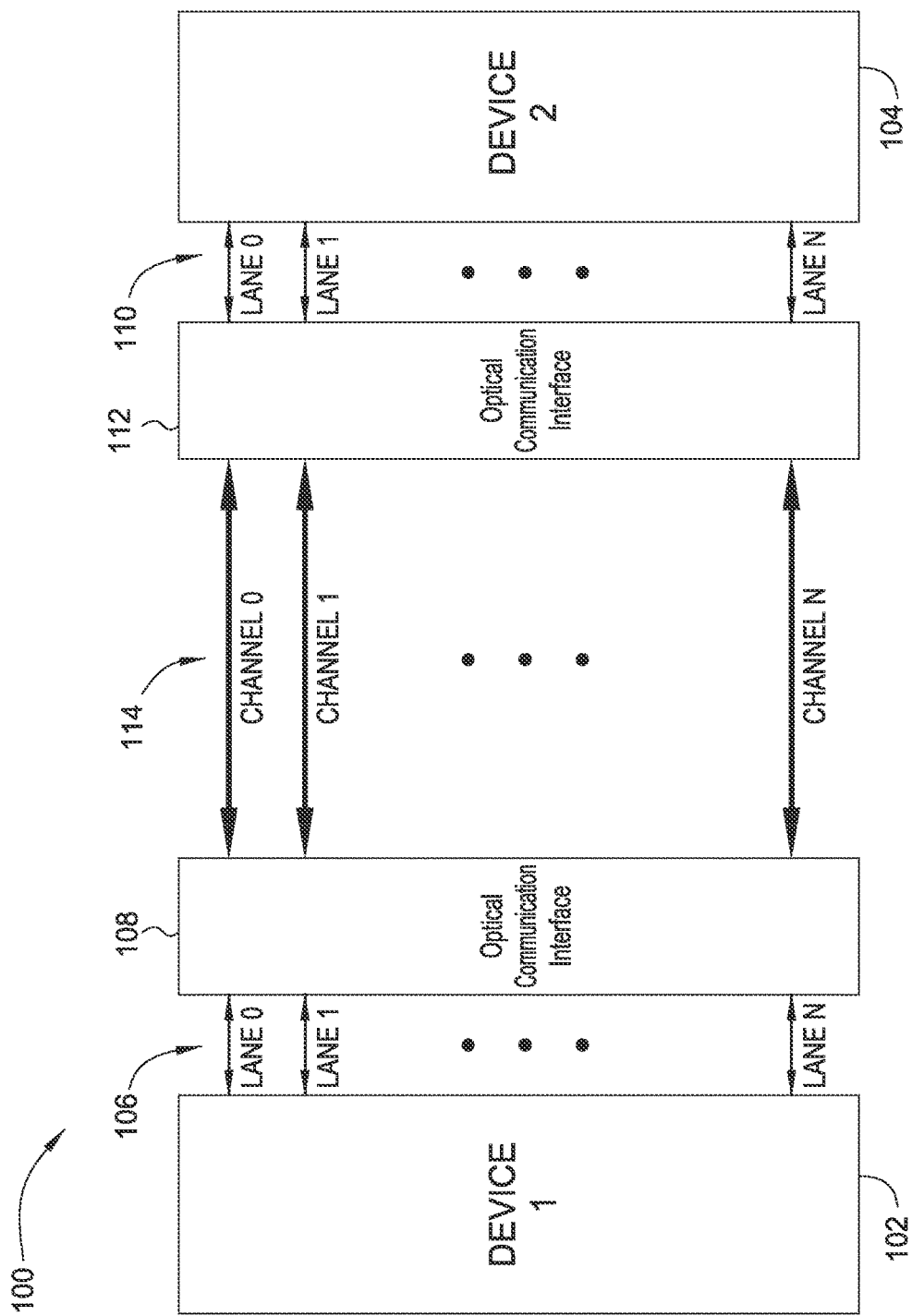
FIG. 1 illustrates a communication interface between two devices, according to certain embodiments of the present disclosure.
Figure 2:
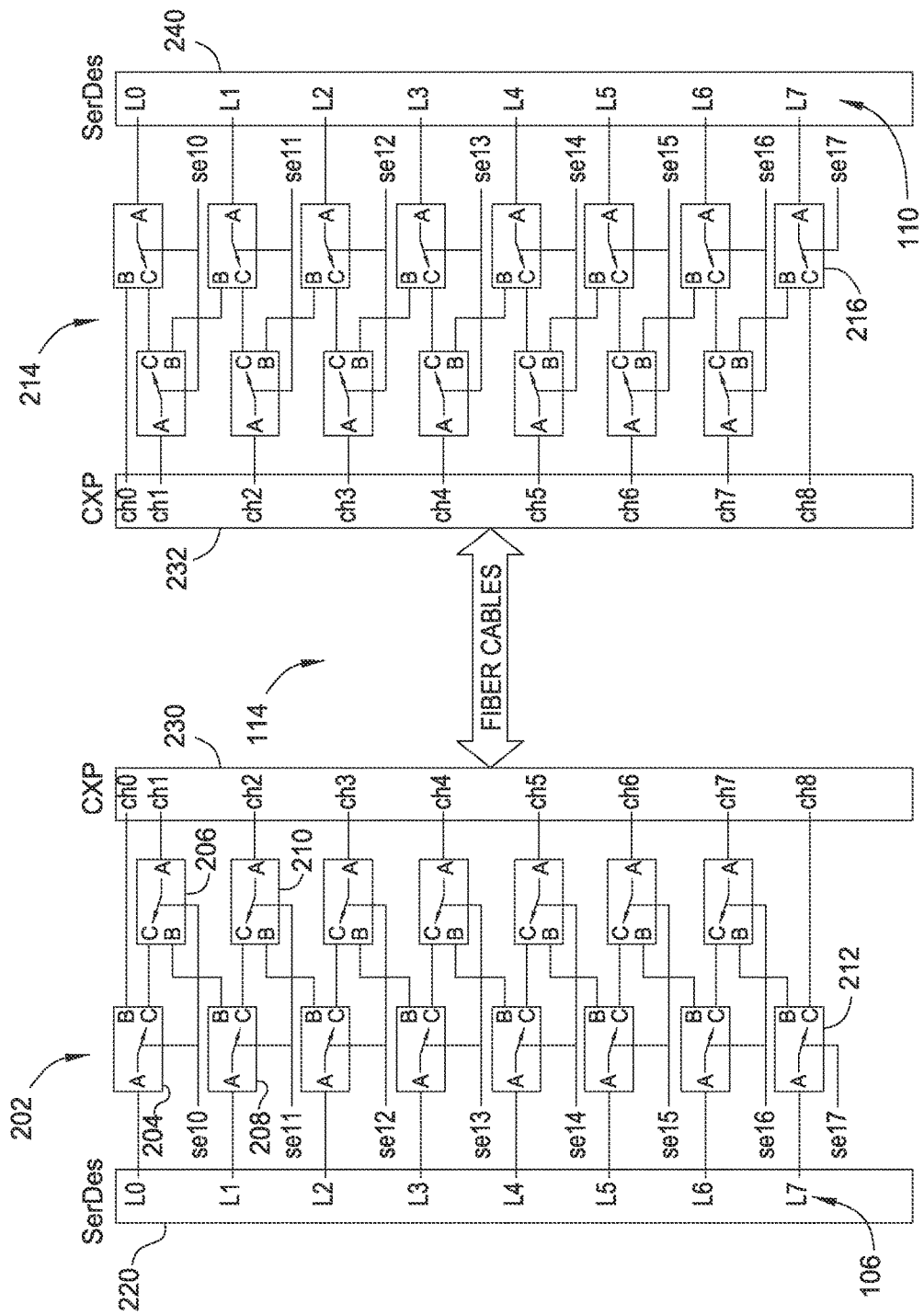
FIG. 2 illustrates an optical channel sparing operation using a multiplexer (MUX) array configured to repair a communication link using a spare channel, according to certain embodiments of the present disclosure.

FIG. 1 illustrates a communication system 100 between a device 102 and a device 104, according to certain embodiments of the present disclosure. The communication system 100 includes a plurality of lanes 106 coupling the device 102 to an optical communication interface 108. The optical communication interface 108 may be configured to couple lanes 106 to a plurality of optical channels 114. That is, the optical communication interface may include an electrical to optical converter (CXP) 230 (as illustrated in FIG. 2, but not shown in FIG. 1) configured to convert electrical signals (e.g., received from lanes 106) to optical signals and vice versa. The optical signals may be communicated to the device 104 via channels 114. The optical information received via channels 114 may be converted to electrical signals via a CXP of another optical communication interface 112, and communicated to the device 104 via communication lanes 110. The optical communication interfaces 108, 112 may also be used to convert optical signals received via channels 114 to electrical signals, which may be communicated to device 102 and device 104, respectively.

When a channel failure occurs (e.g., at least one of channels 114) in a link during normal link operation, the link may be retrained to operate with a reduced link width. That is, a reduced number of lanes 106 and channels 114 may be used for communication between the device 102 and the device 104. However, it may not be possible to only deactivate the channel (and corresponding lane) that is experiencing a failure and continue communication using the other operational channels. For example, PCIe communication may be configured to use either the first channel (×1 link), the first two channels (×2 link), the first four channels (×4 link), the first eight channels (×8 link) or the first sixteen channels (×16 link) for communication. Thus, in a ×16 link, if the second channel (e.g., Channel 1) of a total sixteen channels (e.g., Channel 0-Channel 15) incurs a failure, the link may only use the first channel (Channel 0) for communication. Therefore, if one lane of a PCIe communication interface fails, a block of lanes including the failed lane are eliminated from participating in an active link, which may result in a significant reduction in communication bandwidth. Therefore, reducing an amount of time needed to repair the failing channel to bring the communication interface back to full bandwidth is important.

FIG. 2 illustrates an optical channel sparing operation using a multiplexer (MUX) array 202 configured to replace a failing channel with a spare channel, according to certain embodiments of the present disclosure. As illustrated, at least one Serializer/Deserializer (SerDes) 230 may be used to generate signals for lanes 106 (e.g., L0-L7). In certain embodiments, SerDes 230 may be part of the device 102 of FIG. 1. The lanes 106 may be coupled to a plurality of optical channels 114 (e.g., Ch0-Ch7) via at least one multiplexer of the MUX array 202 and electrical to optical converters (CXP) 230, for example. A controller may be used by device 102 to control the MUX array 202 via the select lines (e.g., se10-se17), to adjust electrical/optical connections between lanes 106 and channels 114. For example, L0 may be coupled to Ch0 via MUX 204 (e.g., where MUX 204 is configured to couple node A to node B), but may also be coupled to channel 1 via MUX 204 and MUX 206 (e.g., where node A of MUX 204 is coupled to node C, and node C of MUX 206 is coupled to Node A). In a similar fashion, L1 may be coupled to Ch1 via MUX 208 and MUX 206, or Ch2 via MUX 208 and MUX 210.

In certain embodiments of the present disclosure, at least one of the channels 114 may be a spare channel. For example, Ch8 may be designated as a spare channel. Thus, if Ch7 fails, a corresponding Lane (e.g., L7) may be coupled to the spare channel (e.g., Ch8) by controlling the MUX array 212. Moreover, if Ch4 fails, for example, L4 may be coupled to Ch5, L5 may be coupled to Ch6, L6 may be coupled to Ch7, and L7 may be coupled to Ch8, thus, returning the communication link width back to the initial number of active channels (e.g., 8 channels) by using the spare channel.

As illustrated, a similar MUX array 214 may be used to couple the communication lanes 110 (e.g., generated by at least one SerDes 240) from the device 104 to channels 114, through electrical to optical converters (CXP) 232, for example. For example, where MUX 212 is configured to couple L7 to Ch8 (e.g., due to a failure on Ch7), MUX 216 may also be configured to couple Ch8 with L7, such that information from device 102 sent on L7 is transferred to L7 of the device 104.

While the sparing operation described with respect to FIG. 2 allows for a communication link to be repaired, the communication may be deactivated for a period of time after a failed lane has been repaired. For example, when faulted lanes are restored with channel sparing operation as described with respect to FIG. 2, a process to restore the link width to full capacity may be initiating. This process includes link training with fundamental reset or hot reset, which may force the entire link partner devices (e.g., devices 102, 104) to enter into a reset condition and cause the link to drop from active status to inactive status. This causes a link down time, which introduces an interruption in normal system operation flow.

Embodiments of the present disclosure provide a process to repair a communication link and return the communication link back to full capacity with reduced down time. For example, in certain embodiments, a device (e.g., device 102) may survey link status with regular polling and restore the link capacity to full advertised link width through channel sparing if link width is less than an initial width. The process allows for link retraining while maintaining active link status without falling back to polling or a configuration state (e.g., Link Status State Machine (LTSSM) state) at recovery. That is, embodiments of the present disclosure help keep the link active (e.g., continuing normal system operation) with little to no interruption while repairing the failed lane using an optical channel sparing operation described with respect to FIG. 2 or other lane repairing operations.

The lane repairing method for non-interruptive link operation involves a default mapping scheme of PCIe lanes 106, 110 to optical channels 114 and failure channel switching, and a link status polling and retraining scheme. The link status polling and retraining scheme may be implemented in system firmware procedure. That is, the system firmware procedure may recover the active link width and maintain an active link while channel remapping operations are taking place.

Figure 3:
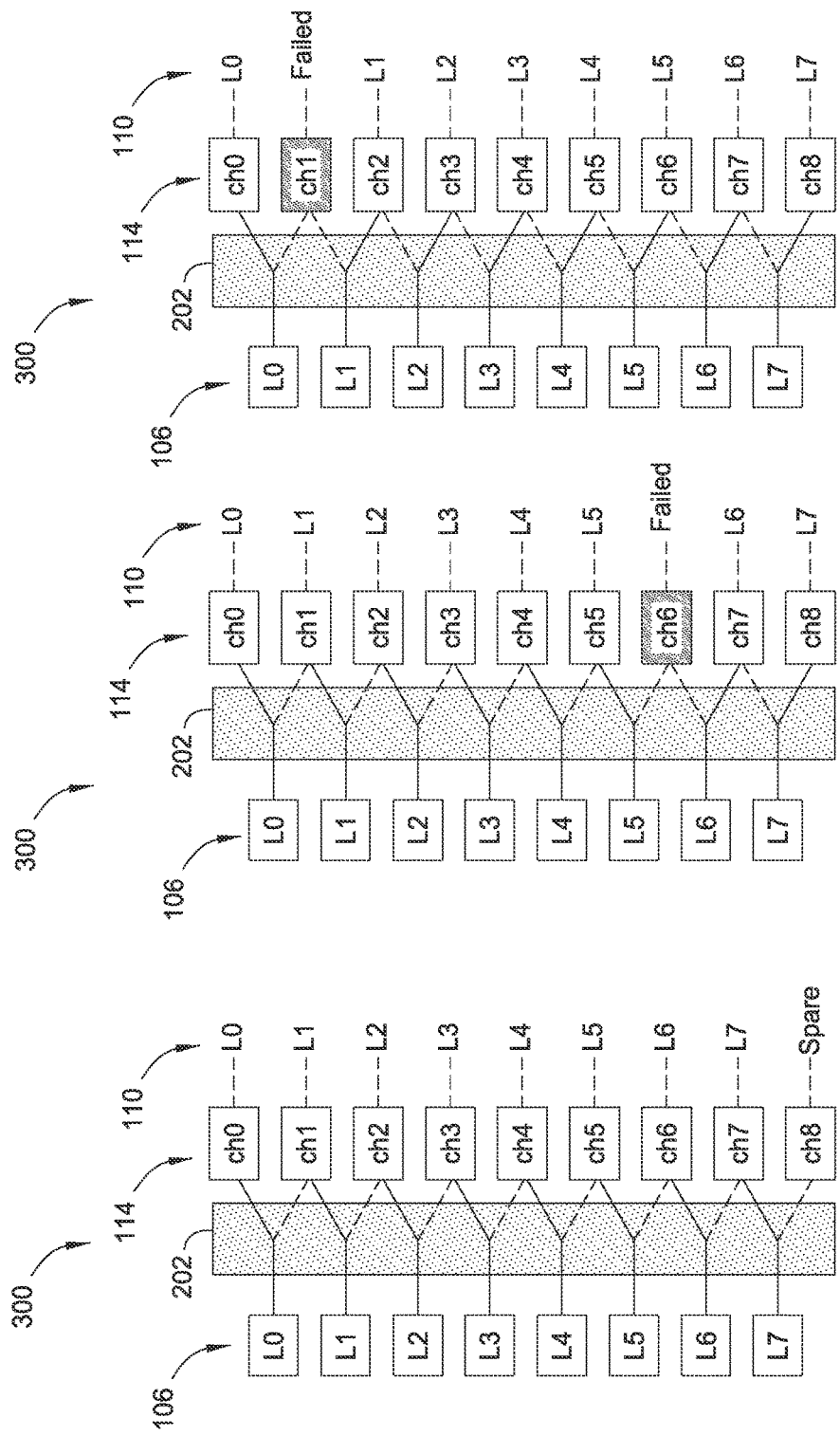
FIGS. 3A-3C illustrate a lane to channel mapping scheme for repairing a communication link with reduced link down time, according to certain embodiments of the present disclosure.

FIG. 3A illustrates a lane to channel mapping scheme of a communication system 300, according to certain embodiments of the present disclosure. As illustrated, the communication system 300 includes eight lanes (L0-L7), selectively coupled with eight active channels (Ch0-Ch7) and one spare channel (Ch8). As illustrated, L0 may be mapped to a non-spare/non-switching designated channel (e.g., Ch0) at initialization. Any other channel (e.g., Ch8 in this case) may be designated as a spare channel. A solid line between a lane (e.g., of lanes 106) a corresponding channel (e.g., of channels 114) indicate that the lane is coupled to the corresponding channel via at least one multiplexer of the MUX array 202. A dashed line indicates that the lane could be coupled to the corresponding channel.

As the link width is reduced from the negotiated link width (N) at initialization (for example, ×16) to a smaller link width ×8, ×4, ×2 or ×1 depending on which lane has experienced a failure, the link can stay active as long as L0 is active and not interrupted. Thus, lanes 106 are mapped (interconnected) to channels 114 such that L0 path is not disrupted when channel to lane remapping (e.g., to replace failing channel using a spare channel) is taking place. Therefore, unless the non-switching channel (e.g., Ch0) connected to L0 fails, communication should continue using at least L0 even though one or more other channels may have experienced a failure.

FIG. 3B illustrates the communication system 300 where Ch6 incurs a failure, according to certain embodiments of the present disclosure. While repairing the channel failure, L0 can remain active and so does Ch0 to Ch3. Therefore, while Ch6 is being replaced using a spare channel, communication can continue using a ×4 link (Ch0-Ch3). Once the channel failure has been repaired (e.g., by coupling L6 to Ch7, and L7 to the originally spare Ch8), communication can continue at full capacity using, for example, 8 channels.

FIG. 3C illustrates the communication system 300 wherein Ch1 incurs a failure, according to certain embodiments of the present disclosure. In this case, communication can continue using only Ch0 (e.g., ×1 link) while the channel failure is being repaired using the spare channel 8.

Figure 4:
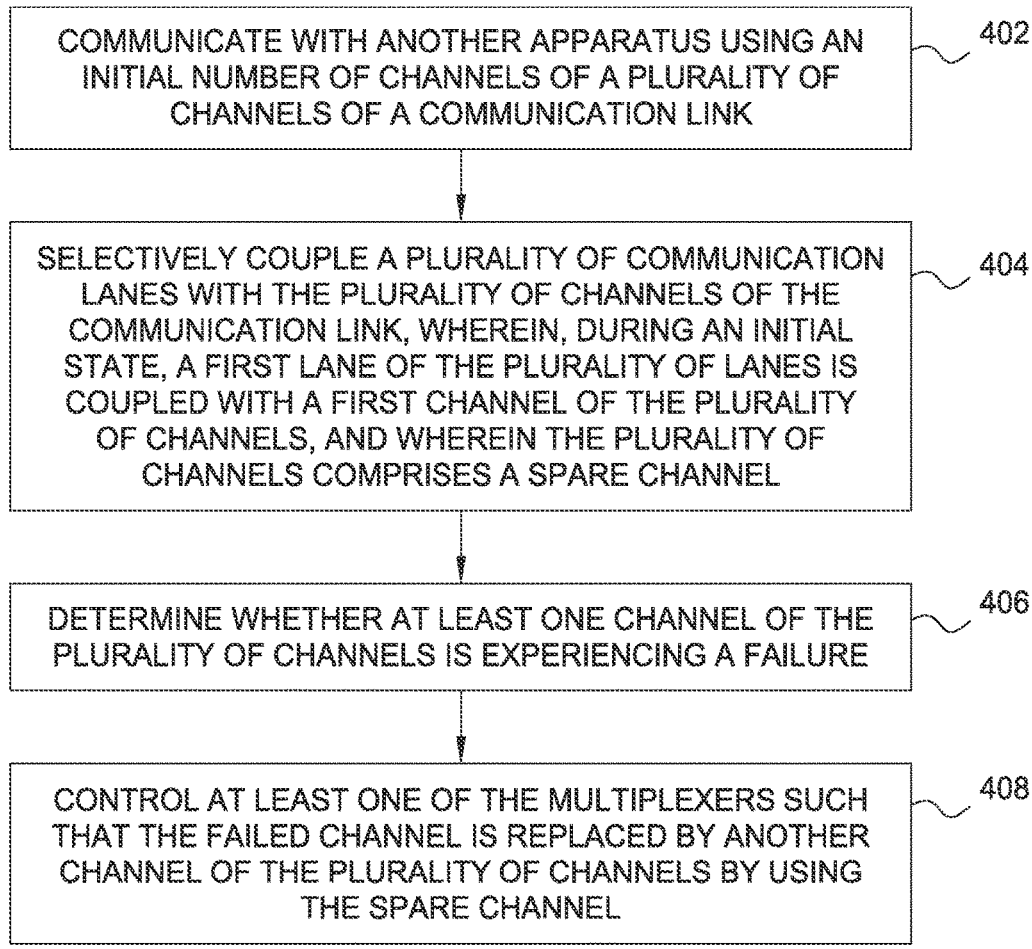
FIG. 4 illustrates example operations for repairing a communication link failure, according to certain embodiments of the present disclosure.

FIG. 4 illustrates example operations 400 for repairing communication link failure, according to certain embodiments of the present disclosure. The operation 400 may be performed, for example, by a controller of an apparatus such as the device 102 of FIG. 1.

The operations 400 begin, at 402, by communicating with another apparatus using an initial number (N) of channels of a plurality of channels of the communication link. The apparatus may, at 404, selectively couple a plurality of communication lanes with the plurality of channels of the communication link, wherein, during an initial state, a first lane of the plurality of lanes is coupled with a first channel of the plurality of channels. In certain embodiments, the plurality of channels may comprise a spare channel. At 406, the apparatus determines whether at least one channel of the plurality of channels is experiencing a failure, and at 408, controls at least one of the multiplexers such that the failed channel is replaced by another channel of the plurality of channels by using the spare channel.

Figure 5:
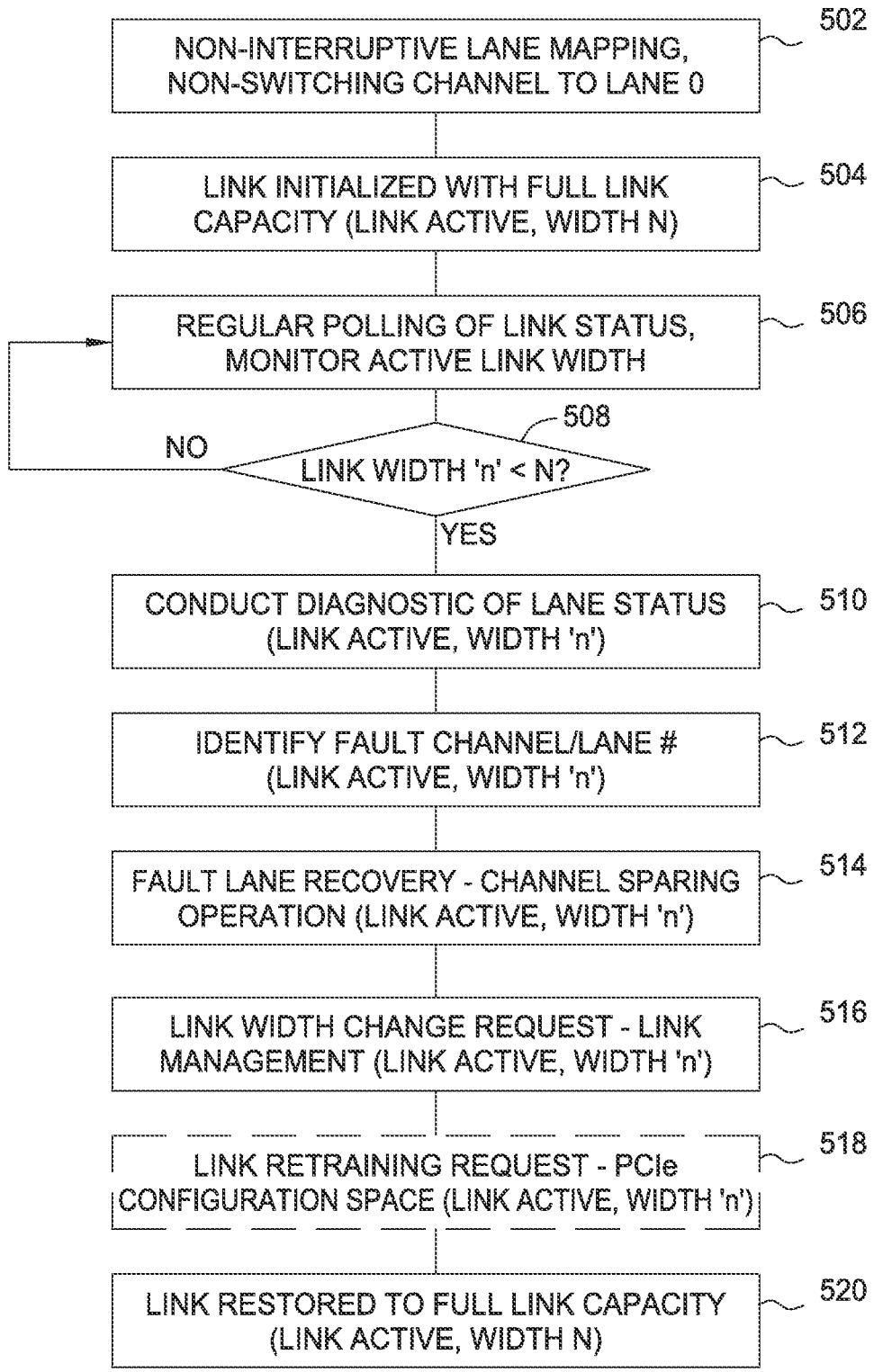
FIG. 5 illustrates example operations for repairing a communication link failure and returning the communication link back to full capacity, according to certain embodiments of the present disclosure.

The operations of FIG. 4 are described in more detail with respect to operations 500 of FIG. 5.

FIG. 5 illustrates example operations 500 for repairing a communication link failure, according to certain embodiments of the present disclosure. The operations 500 may be performed, for example, by a controller of an apparatus such as the device 102 of FIG. 1.

The operations begin at 502, where the apparatus performs a non-interruptive lane mapping process. That is, as described above, the apparatus may map L0 to the non-switching channel (e.g., Ch0) by controlling the MUX array 202. At 504, the link may be initialized to full capacity (e.g., link active using link width N) via a link initialization procedure for communication between the apparatus and another apparatus. At 506, the first device 102 may perform regular polling of the link to determine, at 508, whether the link width has been reduced. That is, the apparatus may determine whether a link width n determined at 506 is less than the initial link width N, indicating that a channel of the plurality of channels 114 has failed. As a result, communication may continue with a reduced number of communication lanes and channels. The apparatus may then conduct diagnostics of the lane status at 510, and identify the faulty channel/lane number at 512 (e.g., determine an identifier corresponding to the failed channel). For example, the apparatus may identify the non-working lane (channel) among inactive lanes from reading optical transceiver registers for fault lane status and/or reading SerDes lane registers for training sequence detect status.

At 514, the apparatus may repair the communication channel by, for example, using the channel sparing operation described in FIG. 2 to replace the failed channel with a spare channel. Once the channel has been repaired, the apparatus may send a link width change request, at 516, to the other apparatus (e.g., to a PCIe host) indicating that the link width can be returned to the initial link width N. In certain embodiments, at 518, the controller may optionally send a link retraining request (e.g., an up-configure request) in order to initiate a retraining of the link. However, the retraining request may only be necessary if the link width change request is not successful to return the link width to the initial link width N. At 520, communication between the apparatus and the other apparatus may continue at full capacity with link width returned to the initial link width N.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. An apparatus for repairing a communication link failure, comprising:
   a controller configured to initialize the communication link for communication with another apparatus using an initial number of channels of a plurality of channels;
   a plurality of multiplexers configured to selectively couple a plurality of communication lanes with the plurality of channels of the communication link, wherein, during an initial state, a first lane of the plurality of lanes is coupled with a first channel of the plurality of channels, wherein the plurality of channels comprises a spare channel, and wherein the controller is further configured to:
      determine whether at least one channel of the plurality of channels is experiencing a failure; and
      control at least one of the multiplexers such that the failed channel is replaced by another channel of the plurality of channels by using the spare channel, wherein the apparatus is configured to communicate with the other apparatus using a reduced number of channels that is less than the initial number of channels during a time period from when the failure is determined to when the failed channel is replaced by the spare channel, wherein the controller is configured to determine that the at least one channel is experiencing the failure by determining whether a number of channels used for communication via the communication link is less than the initial number of channels.

2. The apparatus of claim 1, wherein the controller is further configured to send a link width change request to the other apparatus after the failed channel is replaced by the other channel, wherein a number of channels used for communication with the other apparatus via the communication link is returned to the initial number of channels based on the link width change request.

3. The apparatus of claim 1, further comprising an electrical to optical converter configured to optically communicate information received via at least one of the plurality of lanes using at least one fiber optic cable.

4. The apparatus of claim 1, wherein the controller is configured to determine an identifier corresponding to the failed channel.

5. The apparatus of claim 1, wherein the spare channel comprises a last channel of the plurality of channels.

6. A computer program product for repairing a communication link failure, the computer program product comprising a non-transitory computer readable storage medium having program instructions embodied therewith, the program instructions executable by a processor to cause the processor to:

communicate with another apparatus using an initial number of channels of a plurality of channels of the communication link;

selectively couple a plurality of communication lanes with the plurality of channels of the communication link, wherein, during an initial state, a first lane of the plurality of lanes is coupled with a first channel of the plurality of channels, and wherein the plurality of channels comprises a spare channel;

determine whether at least one channel of the plurality of channels is experiencing a failure;

control at least one multiplexer such that the failed channel is replaced by another channel of the plurality of channels by using the spare channel; and communicate with the other apparatus using a reduced number of channels that is less than the initial number of channels during a time period from when the failure is determined to when the failed channel is replaced by the spare channel, wherein determining whether the at least one channel is experiencing the failure comprises determining whether a number of channels used for communication via the communication link is less than the initial number of channels.

7. The computer program product of claim 6, wherein the program instructions are executable to further cause the processor to send a link width change request to the other apparatus after the failed channel is replaced by the other channel, wherein a number of channels used for communication with the other apparatus via the communication link is returned to the initial number of channels based on the link width change request.

8. The computer program product of claim 6, wherein the program instructions are executable to further cause the processor to determine an identifier corresponding to the failed channel.

9. The computer program product of claim 6, wherein the spare channel comprises a last channel of the plurality of channels.

* * * * *